Oct. 26, 1926.  1,604,693
H. HECHT ET AL
MEANS FOR SIGNALING UNDER WATER
Filed Jan. 6, 1921     3 Sheets-Sheet 1
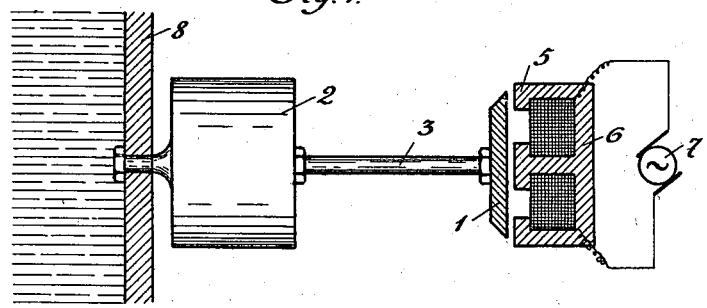
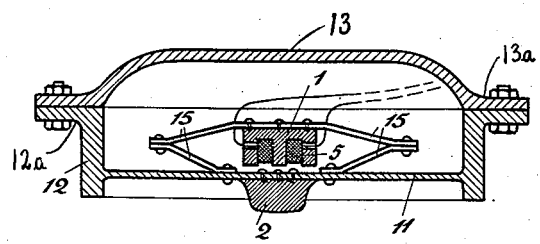
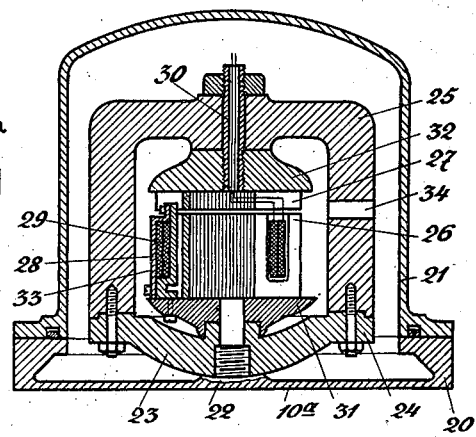
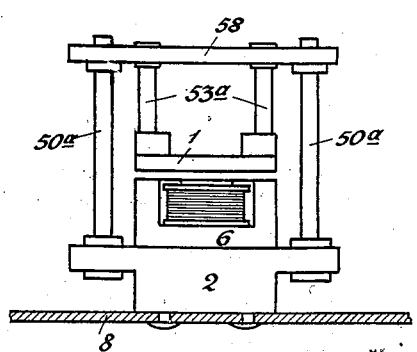
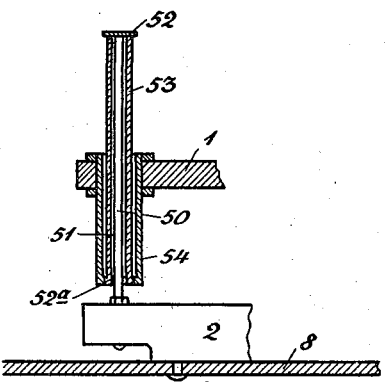

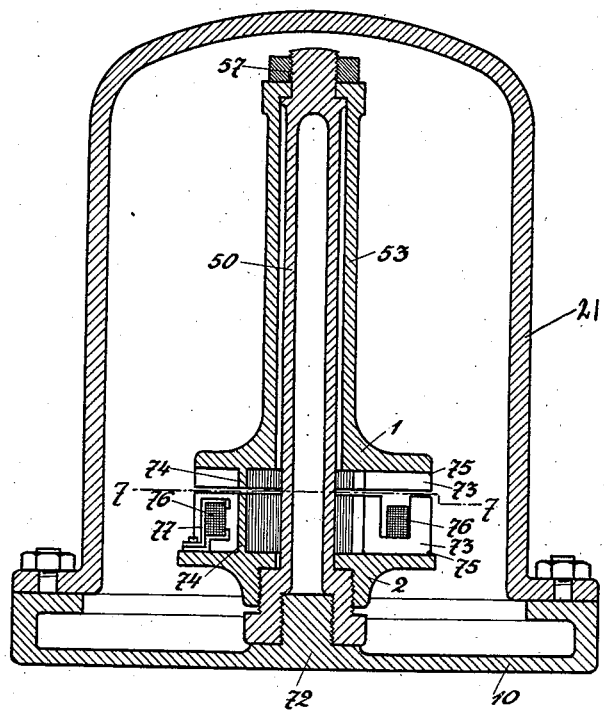
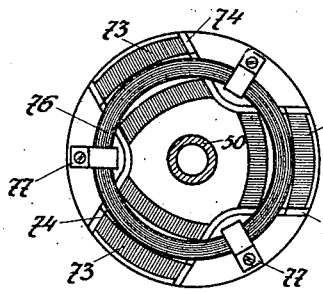
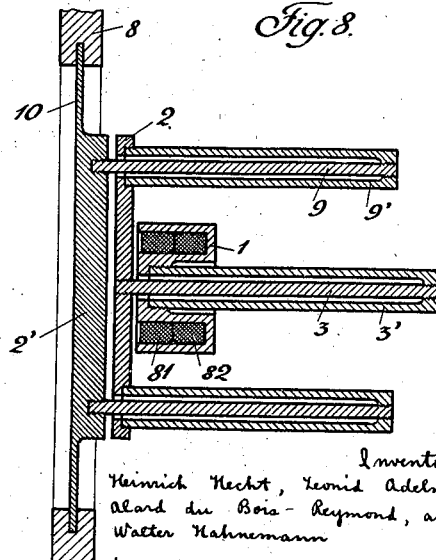

Oct. 26, 1926. 1,604,693

H. HECHT ET AL

MEANS FOR SIGNALING UNDER WATER

Filed Jan. 6, 1921  3 Sheets-Sheet 3

Inventors
Heinrich Hecht, Leonid Adelmann,
Alard du Bois-Reymond, and
Walter Hahnemann by Knight Bros
Attorneys Patented Oct. 26, 1926.

1,604,693

UNITED STATES PATENT OFFICE.

HEINRICH HECHT AND LEONID ADELMANN, OF KIEL, ALARD DU BOIS-REYMOND, OF PLON, NEAR KIEL, AND WALTER HAHNEMANN, OF KITZEBERG, NEAR KIEL, GERMANY, ASSIGNORS TO THE FIRM SIGNAL GESELLSCHAFT M. B. H., OF KIEL, GERMANY.

MEANS FOR SIGNALING UNDER WATER.

Application filed January 6, 1921, Serial No. 435,563, and in Germany December 16, 1914.

(GRANTED UNDER THE PROVISIONS OF THE ACT OF MARCH 3, 1921, 41 STAT. L., 1313.)

This invention relates to devices for signaling under water in which an oscillatory structure, is interposed between the sound radiating member that abuts against the water (i. e. a hull, wall, or diaphragm) and an energy-converting-means, i. e. a detector, which may take the shape of a microphone that converts sound energy into electrical energy, or an energy expender such as an electromagnet or a hammer which converts electrical or mechanical energy into sound energy.

These oscillatory or vibratory structures have hitherto preferably been made in the form of tuning forks, rings or similar vibratory bodies whose mass is distributed pretty uniformly over all of their parts. But this form of oscillatory structure is objectionable, for it has become evident when using vibratory bodies of this kind, such as tuning forks and the like, that, on account of their mass being evenly distributed over all of their parts, failure attends nearly all attempts to make the energy radiated from the radiating member (i. e. the vibrating diaphragm or plate abutting against the water) and hence the energy consumed in effecting radiation (i. e. the radiation damping) equal to any desired amount. This is due to the fact that the nodal points produced in these structures are displaced according to the manner in which the structures are coupled with their sound radiating member (wall or diaphragm) and the said nodal points tend to shift more or less into the point of coupling, this causing the structure to vibrate in such a manner that the oscillations obtained are almost undamped so that the energy radiated when sending out signals in much too little. Hence in the case of submarine sound signal receivers where the radiation damping should be equal to the useful damping in order to obtain the highest possible efficiency—or in other words, where the amount of energy that the oscillating structure on being excited retransmits to the radiating member (diaphragm, wall, or hull) and sends back to the exciting medium (water) should be equal to the amount of energy that it passes on to the receiving instrument—it is not possible to bring the radiation damping to a figure that will meet this requirement.

The object of the present invention is to provide a form of oscillatory structure which will permit of the magnitudes of the radiation damping and of the useful damping of a sound signalling device being adjusted to any desired figure. The prominent feature of the invention is that the intermediate member interposed between the radiating member and the aforementioned energy-converting-means of the signaling device consists of an oscillatory structure in which the elastic forces operate in a place or places that is, or are, separate or distinct from the principal mass or substance of which the structure is composed. By analogy to the electric art, in which concentrated capacity and inductance are spoken of as distinguished from distributed capacity and inductance, the structure here may be said to possess concentrated elastic force and mass as distinguished from distributed elastic force and mass, respectively. Hence the fundamental feature of the invention conists in a structure composed, physically speaking, of two masses connected by an elastic member or members, and the principal characteristic of a sound signaling apparatus equipped with an oscillatory structure according to the invention is that the one mass of the oscillatory structure is attached to the radiating member (diaphragm, hull), which forms a part of most apparatus, while the other mass of the apparatus affect the first mass through the medium of the elastic member or members by which the masses are connected. It must be observed that the total mass acting at the end of the oscillatory structure which is nearest or directly attached to the radiating member comprises the particular mass or head of the oscillatory structure that is directly attached to the radiating member, a certain portion of the mass of the radiating member itself, and a certain quantity of the water in the neighbourhood of the radiating member. This sum of masses may be termed the couterweight of the mass to which it is connected by elastic members, which latter mass may be called the freely oscillating or unrestrained mass. The arrangement of the masses of the oscillatory or vibratory structure is preferably such as to result in the effective forces in the structure operating in the same direction as the oscillations to which the structure is subjected. An advantageous construction is one in which the imaginary straight line between the centers of gravity of the masses of the structure coincides with the direction of the oscillations to which the structure is subjected.

Instead of interposing between the energy converter and the sound radiator only one oscillatory structure whose mass and elastic force reside in separate portions of its body, a plurality of such oscillatory structures may be coupled to each other, the arrangement advantageously being such that the energy transferred from the radiator to the energy converter or vice versa passes through the structures one after the other. If the elastic forces in the radiator co-operating with an arrangement of this kind are practically nil, the individual vibratory structures taken together form a vibratory system which has as many natural periods of vibration as there are structures in it. Of course the radiator itself might also form an individual vibratory structure, but its construction need not be such as to cause its mass and elastic forces to reside in separate or distinct parts of its body, i. e. the mass and elastic forces of the radiator may be uniformly distributed over its body.

By employing an arrangement comprising a plurality of vibratory structures the restrictions governing the construction of the various parts, especially the masses, are to a large extent removed. This might sometimes be important as, for example, in a case where both a certain amplitude of motion for each of the masses of the oscillatory structure is given and the electromagnetic or mechanical properties of the system are also specified. Besides it is thus much easier to obtain a considerable, and for reasons to be hereinafter explained, often necessary increase of the amplitudes of the radiator in the direction towards the converter.

An advantage of providing a plurality of vibratory structures or a "vibratory system" is that the range of frequencies within which signals can be transmitted with a maximum effect is considerably widened since each additional vibratory structure may be tuned so as to be resonant at a different frequency and the various coupled individual vibratory structures may be made to have the crests of their resonance curves to correspond to frequencies which follow upon each other at certain, more or less short, intervals; so that the resultant resonance curve that would be obtained by adding to each other the individual curves peculiar to the various coupled vibratory structures would be one that has a number of crests at certain distances apart and comparatively small dips or depressions between the crests. Hence the energy sent out would be practically at a maximum throughout the whole range of frequencies that lies in the region extending from the first to the last of the proximate crests that the total curve comprises. It will be apparent that an arrangement of this kind would be a safeguard against the alternating current machine of the sound producer getting out of resonance through fluctuations of its speed.

The tuning chosen for the various vibratory structures is, of course, not a matter of indifference. If only a single structure is provided, and the radiator does not execute any vibrations of its own, but has all the movements it executes imparted to it by the vibratory structure, it will be obvious, without further consideration, that it is advantageous to tune this single vibratory structure so that it is resonant at the period of vibration or frequency of the sound used for signaling. If, on the other hand, the radiator executes vibrations of its own, i. e. if it is an independent vibratory structure, the two structures of the apparatus are each tuned independently to be resonant at the signaling frequency and hence each structure is tuned to have the same natural period of vibration as the other. On account of the fact that the two structures, the radiator and the actual vibratory structure, are tightly or closely coupled to each other the mass and elastic forces residing in each structure will be partly imparted to the other so that the frequency of resonance will be changed and the vibratory system composed of the two independently vibrating structures will have two frequencies of resonance one of which will in this case lie above and the other below the signaling frequency. The term "signaling frequency" when employed in this connection means; when receiving, the rate of vibration of the arriving sound, when sending, the rate of alternation of the exciting force, as, for example, the frequency of the current of an electric alternating current generator. By making the one frequency of resonance higher and the other lower than the signaling frequency and by causing these two frequencies to be fairly close to each other so that the two crests in the resultant resonance curve obtained by combining the two individual curves are near each other and the dip of the resultant curve in the region between the two crests is comparatively small, a remarkable widening of the region of resonance of the vibratory system, and hence of the range of frequencies, is obtained within which sound signals can be sent or received with a maximum or an approximate maximum of energy. The arrangement can of course be such that the signaling frequency coincides with the one or the other of the frequencies of resonance or of the crests of the resonance curve of the composite vibratory system.

But this bi-resonant feature of the system may also be employed for the purpose of sending or receiving with two different frequencies, each of which coincides with one of the frequencies of resonance of the vibratory system.

If more than two individual vibratory structures are coupled to each other, the number of frequencies of resonance of the composite vibratory system will be correspondingly increased, and hence an increased broadening of the region of resonance of the resonance curve, or an enhanced possibility of selecting various resonant signaling frequencies is obtained.

In vibratory systems of this kind the degree of accuracy with which the resonance of the various individual vibratory structures may be made to coincide depends upon the degree of tightness or closeness of the coupling between the various structures.

The masses and the elastic member or members of an oscillatory structure may be constructed in various ways. The most elementary form of structure would consist, for instance, of two masses inelastic relatively to the rest of the structure in the shape of metal spheres or cylinders whose centers of gravity are connected by a straight elastic rod extending in the direction of the oscillations to which the structure is subjected.

It has been found by experiment that if a structure of this kind is supported so as to allow its parts to execute unrestrained movements, and then caused to vibrate for instance by a sound or other force, a nodal point will be produced at that point of the elastic rod that coincides with the common center of gravity of the two masses. The phases of the vibrations of the two masses are displaced relatively to each other by 180° and the amplitudes of these vibrations are inversely proportional to the magnitudes of the respective masses. The motion of any one of the masses always depends on the physical properties of that part of the structure which is situated at the same side of the nodal point as the mass in question, and in order that the vibrations of this mass may remain unchanged it is only necessary that the nodal point remains unmoved. Thus in the case of a structure of this kind having a certain natural period of vibration the relative sizes of the two masses may be altered by the designer as he thinks fit inasmuch as he is able, in the case of a structure where the size of one mass—say that of the unrestrained or freely vibrating mass—is given, to make the other mass that acts as a counterweight as small or large as he chooses; provided that, in selecting or altering the length of the part or the elastic connecting member which lies between the nodal point and the mass the size of which is to be altered, he takes care that an increased size of the mass is accompanied by a proportionate shortening of the corresponding part of the connecting member or vice versa. The position of the nodal point relative to the one given mass of the structure will then remain constant.

By applying the above-described law, according to which the relative amplitude of the motion of the masses depends upon their size, it is easily possible to satisfy the known requirement that the vibrations at the energy converting means of submarine sound signalling apparatus shall have large amplitudes of motion and small force, while the vibrations effective at the radiator abutting against the almost incompressible water shall have small amplitudes of motion and great force.

In employing more than one vibratory structure for submarine signal work care must be taken to distribute the masses in the structures in such a manner that a larger amplitude of motion exists at the last mass in the series adjacent the energy-converter than at the first mass that is attached to the radiator. The simplest and surest means of accomplishing this is to provide masses whose sizes decrease in the direction from the radiator to the energy converter.

Instead of connecting the two masses by a single elastic rod, a plurality of rods may be used which, for the same length and tuning, must be of such size that the sum of their cross sectional areas must be equal to the cross section of the single rod. The natural period of vibration of the structure is practically independent of the shape of the cross section of the rod or rods so that any form of cross section, such as tubular etc., may be used.

The tubular form of the connecting members is advantageous because it is effective in avoiding the influence of detrimental transverse oscillations of the structures on account of the fact that the resistance of tubes to transverse vibrations is greater than that of solid rods of the same cross section of material. But a full success in this respect will only be achieved if the cross section of the tube is so large that its transverse natural rate of vibration is higher than its longitudinal rate of vibration.

The elastic rod or rods may also be substituted by spring elements such as spiral springs, curved springs, etc., that connect the masses, provided that the springs act in the direction of the vibrations impressed upon the structure. The particular manner in which the energy is transferred to, or taken out of these oscillatory or vibratory structures has nothing to do with the invention itself. In sound producers or senders the vibratory structures may be excited or caused to vibrate by any of the customary electromagnetic contrivances, or a mechanical exciting means such as an eccentric, a rapidly striking hammer or the like may be used. In sound receivers the energy may be taken from the vibratory structure by microphones, electromagnetic devices, or in any other suitable manner. In the case of senders having vibratory structures that are excited electromagnetically, or of receivers from which the energy is taken by electromagnetic devices, the parts of the electromagnets (the field and the armature) are attached to the masses of the vibratory structure, or these masses are themselves formed into parts of the electromagnet. When employing microphones these may be mounted so as to move freely with the mass of the structure to which they are attached, or they may be inserted between a said mass and a fixed abutment. In accordance with the invention the microphone is preferably arranged between the masses of the structure in such a manner that the microphone is excited by their movements. In such cases the masses themselves, or one of them, may be designed to form a part or parts of the microphone, such as its electrodes, for example. The amplitude of the vibrations of the masses of the vibratory structure itself depends on the relative sizes of the masses and, as already been pointed out, advantage may be taken of this circumstance to fulfill the very important requirement in connection with submarine sound signaling apparatus that the part of the structure which is connected to the exciting or detecting device shall execute larger amplitudes than the part that is attached to the radiating member. To accomplish this it is necessary to make the total mass operating at the radiating member larger than the freely vibrating or unrestrained mass that is connected to the said total mass by the elastic members.

In the accompanying drawing a number of examples of apparatus are shown to illustrate the invention.

Figure 1 is a view partially in section and in somewhat diagrammatic form of an eletromagnetically excited submarine sound transmitter, provided with a vibratory structure in accordance with the invention consisting of two inelastic masses connected by an elastic member in the form of a straight rod, one mass being connected to the sound radiator and the other mass forming the armature of the electromagnet;

Figure 2 is a sectional view of an electromagnetically excited submarine sound transmitter, in which the inelastic masses are connected by an elastic member in the form of a leaf spring, one mass being connected to the sound radiator and forming the armature of the electromagnet and the other being supported by the spring and forming the electromagnet proper;

Figure 3 is a sectional view of an electromagnetically excited submarine sound transmitter, in which the special vibratory structure is in the form of a casing having the two inelastic masses inside and at the top and bottom thereof, a portion of the wall of the casing acting as the elastic connecting member, and the upper mass forming the armature of the electromagnet and the lower forming the electromagnet proper;

Figure 4 is a diagrammatic view of an electromagnetically excited submarine sound transmitter, in which the two inelastic masses of the special vibratory structure are connected to each other by two elastic members each having a portion turned back upon itself and to one side in parallel arrangement;

Figure 5 is a view, principally in section, showing a construction in which the elastic connecting member is formed of a solid rod surrounded by concentrically arranged tubes connected in such manner as to effect a reversal or back and forth extension of the member;

Figure 6 is a section of a practical form of apparatus which may be used either as a submarine sound transmitter or receiver. In this form the two masses are connected by an elastic member formed of two concentrically arranged hollow rods or tubes connected together at one end and each attached to a different mass at the other end;

Figure 7 is a section showing the arrangement of the electromagnet in the apparatus of Figure 6, and taken along the lines 7—7 of Figure 6;

Figure 8 is a section showing a form of apparatus provided with a plurality of special vibratory structures according to the invention, these vibratory structures being coupled together through the medium of a common mass;

Figure 9:
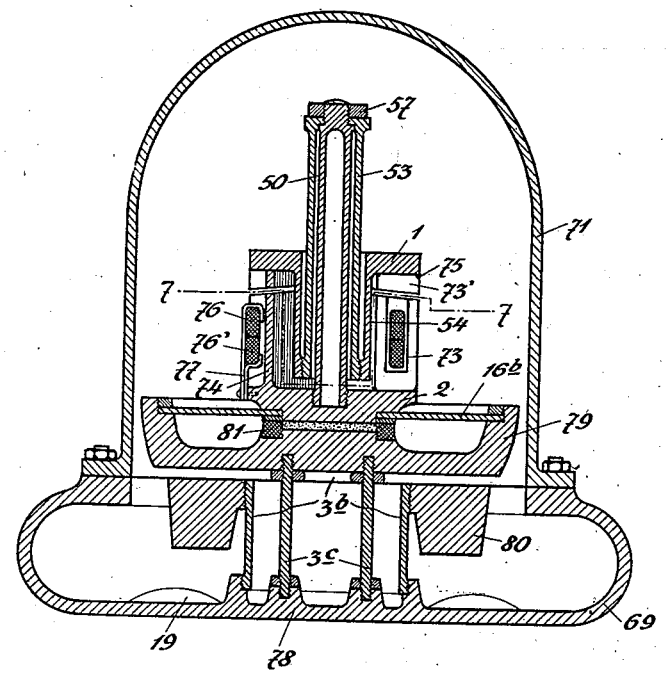
Figure 9 is a section showing another form of apparatus provided with a plurality of vibratory structures coupled together. This apparatus is provided with a microphonic receiver, and with an electromagnetic device which may be employed either for sending or receiving.

In practical signaling a given mass such as the hull or skin 8, Fig. 1, of a vessel or ship is often used as a sound radiating member or diaphragm. But since, in accordance with the invention, the size of the particular mass of the oscillatory structure which is to be coupled to the said diaphragm may be made to suit any requirements, a means is at hand by which the proper radiation damping (i. e. the damping due to the radiation of energy by the diaphragm) may be obtained by suitably proportioning the said mass to the free or unrestrained mass.

In many cases it will be preferable to use a special vibrating plate instead of the ship's hull as a radiating member. The mass of this plate or diaphragm alone, or the mass of the diaphragm added to the supplemental mass of a part or parts, which form necessary constructional elements of the apparatus, then forms the basis for the calculation of the complementary mass, or that mass of the vibratory structure which is to be coupled to the mass of, or at, the diaphragm.

In Figure 1, a signaling apparatus with an elementary form of vibratory structure according to the present invention is shown with two masses 1 and 2 connected by an elastic bar that extends in the direction of the vibrations to which the structure is subjected. The mass 1, which is smaller than the mass 2, and which consequently executes oscillations of larger amplitude than mass 2, forms the armature of an alternating current electromagnet 6 that is excited by an energizing coil 5. The coil 5 is connected to any suitable alternating current generator 7. The mass 2 of the apparatus is rigidly coupled to the ship's hull 8. The vibrating portion of the hull 8 together with the abutting water that vibrates in unison with it and the mass 2 form the one mass of the vibratory structure whose other mass is 1.

In an apparatus in which the mass nearest to the diaphragm or radiating member is rigidly coupled to this diaphragm, as in the preceding figures, it might happen that the structure is damped to such an extent that it no longer executes any perceptible vibrations of its own. But strictly speaking this only applies to comparatively massless diaphragms or very thin diaphragms practically without substance and to masses which, in comparison with the mass of the water affected by the radiation of the energy, are very small. In cases where the radiation damping would be too great it can be reduced by making the coupling between the radiating member and the vibratory structure less rigid, i. e. more or less loose. This can be accomplished by coupling the diaphragm or hull (radiator) to the nearest mass of the vibratory structure by means of an elastic member, as for example by an elastic metal rod the size and properties of which will determine the rigidity of the coupling.

By the insertion of an elastic member between the radiating member or radiator and the neighbouring mass of the vibratory structure a vibratory system is formed that may be multi-resonant, i. e. that may respond with a maximum of effect to various frequencies or rates of vibration. Such a multi-resonant vibratory system may be resolved into parts as follows: The usual two masses connected by one or more elastic members form one vibratory structure that executes its own vibrations; while a second vibratory structure executing vibrations peculiar to itself is formed by the mass nearest to the radiator or diaphragm, the elastic member connecting the said mass to the diaphragm, and a portion of the mass of the diaphragm itself together with a certain quantity of the water against which the diaphragm abuts. If the diaphragm is not so rigid that all its parts are forced to execute precisely the same vibrations as the end of the elastic member attached to it, but is elastic enough to execute appreciable vibrations of its own, it may be regarded as a third vibratory structure. It will however generally be supposed that the entire diaphragm is positively vibrated by the special vibratory structures, and if this is so the vibratory system is to be regarded as a system consisting of two vibratory structures that acts on the positively excited diaphragm. To enable a system of an increased efficiency to be obtained, the two vibratory structures are tuned with respect to each other. By this means the efficiency of the sound signaling apparatus, as compared to an apparatus having only one tuned structure, or two structures which are not tuned with respect to each other, can be considerably increased (from about 50% to 90%).

In accordance with the invention the distribution of the masses in the structures of the multi-resonant system is such that the amplitude of the oscillations of the diaphragm (the radiator) is increased in the direction from the diaphragm towards the said masses. An advantage of distributing the magnification or transformation of the amplitudes over a plurality of vibratory structures is that the quantity of the mass required at the diaphragm itself is then relatively smaller, or that the unrestrained mass of the first vibratory structure can be made larger than if the same ratio of transformation were to be obtained with one vibratory structure only. This latter feature is very desirable in many cases and another very advantageous feature of such an arrangment is that the radiation damping is increased in a very desirable degree while at the same time a large ratio of transformation is obtained.

An apparatus having the above arrangement of a system or plurality of vibratory structures coupled together is shown in Figure 8. In this embodiment, one vibratory structure 1, 3, 3', 2, has its masses 1, 2, connected by a single elastic member 3, 3'; while the other vibratory structure, 2, 9, 9', 2', has its masses 2, 2', connected by two elastic members 9, 9'. These elastic members, in the case of each vibratory structure, are formed of a rod and a concentrically arranged tube surrounding the same. The mass 2' includes a certain calculatable portion of the sound propagating medium which vibrates in phase with the diaphragm. The mass 2 is common to both vibratory structures, and couples them together. Assuming the tuning of the individual vibratory structures to be of proper values, the relative size of this common mass determines the degree of coupling. The weight or mass 1 is formed in the shape of an electromagnet having one coil 81 for excitation by alternating current and a second coil 82 for direct current by which the iron is polarized. The mass 2 acts in this case as an armature of the magnet. It would of course be no departure from the invention to make the two masses 1 and 2 or any other pair of masses or all of them in the form of bodies carrying exciting coils. It is also obvious that the elastic members may be made in the form of diaphragms or springs as is described in connection with other constructional forms and which do not execute longitudinal but instead execute transverse vibrations.

The arrangement shown in Figure 8, constitutes a bi-resonant system. If the diaphragm 10 were to execute vibratory vibrations of its own (that is, if it were independently vibratory) the system would be tri-resonant. The diaphragm could be individually tuned to the same frequency as the two vibratory structures proper. Of course, the number of vibratory structures employed could be more than two. The increase of the number of vibratory structures is accompanied by a corresponding increase of the resonance peaks of the vibratory system; and at the same time the possibility of broadening the aggregate crest (composed of the various individual crests with small intervening dips) of the resonance curve, i. e. the possibility of increasing or broadening the range or band of high efficiency or responsiveness of the apparatus is enhanced. Even by using only two vibratory structures instead of one the improvement obtained in this direction is very considerable. The tightness or closeness of the couplings between the various structures depends among other things upon the accuracy with which they are tuned with respect to each other. The tuning must be more accurate to secure a close or tight coupling than to secure a loose one. The frequencies of resonance of the multi-resonant system may each be used for signaling, or any one of these frequencies that might be considered especially advantageous might be selected. The described principle of multi-resonance is equally important for sound senders or receivers or other vibratory apparatus, and any method of excitation or of taking received energy out of the structures may be employed.

In the apparatus shown in Fig. 2, the masses 1 and 2 are connected by an elastic member in the form of a leaf spring 15, instead of by a straight rod as in Fig. 1. The mass 1 acts as a pole piece and carries the alternating current coil 5, thus forming an electromagnet; while the mass 2 is attached to the central portion of the sound radiating diaphragm 11, and serves as the armature of the electromagnet. The diaphragm 11 is carried within a ring 12, which latter is flanged at 12$^a$ to provide a seat for a corresponding flange 13$^a$ on a dish-shaped cap or cover 13. The diaphragm 11, ring 12, and cover 13, form a water-tight casing.

Another special category of sound signaling apparatus provided in accordance with the present invention with a vibratory structure whose vibrating masses are connected to each other by an elastic member or by elastic members, and in which the power is applied to the masses from a point situated between the masses, is illustrated in Fig. 3. In this type of apparatus the sound radiating member consists of a diaphragm 10$^a$ stretched across a ring-shaped flange 20. Fixed upon the flange 20 is a hood 21 which keeps the external water from reaching the internal parts of the apparatus. In the apparatus shown the diaphragm 10$^a$ has a threaded stud 22 at its center to which the rigid cross-piece 23 is fixed. This rigid cross-piece is made in the shape of a concave plate or cup, arranged concentrically to the axis of the apparatus perpendicular to the diaphragm, and carrying a hood 25 upon its marginal flange 24. The horizontal membranous part at the top of this hood forms the elastic connecting member between the masses of the vibratory structure, which latter are formed by the magnetic field taken together with the plate 23, associated plate 31 and the cylindrical part of the hood 25 on the one hand, and the armature 27 together with the carrier plate 32 on the other hand. Mounted upon the plate 31 in the middle portion of the cup 23 is the coil portion of an electromagnet 26 whose armature 27 carried by plate 32 is fixed to the hood 25. The magnetic circuit of the electromagnet is excited by a continuous current or polarizing coil 28, which produces magnetism of unvarying polarity, and by an alternating current coil 29. The current leads are advantageously led in to the magnetizing coils by inserting them through a central hole or passage in the threaded bolt 30 that serves to fix the armature of the electromagnet to the hood 25. In this kind of apparatus the actuating force produces large oscillations of the middle part of the membranous elastic member where the armature is attached, and relatively small oscillations of the cylindrical part of the hood which transmits its oscillations to the radiator. Apparatus of the kind shown in Fig. 3 are advantageously used for sending out high tones. The electromagnet of this apparatus is of a particular form which will be hereinafter more fully described with reference to special figures. It consists of laminated iron cores and a laminated armature whose laminæ extend in directions approximately radial to the axis of the apparatus perpendicular to the radiator. The laminæ are welded together and to the plates 31, 32 that support them. The magnetizing coils are held by special coil holders 33 that are mounted upon the plate 31. The air gap between the magnet poles and their armature may be observed through observation holes 34 in the hood 25.

In the devices shown in Figs. 2 and 3 it is evident that the vibratory energy is applied to or taken from the two masses of the vibrating structure one of which belongs to the radiating member. The relative amplitude of the mutual vibrations of the two masses is determined by the ratio of the sizes of these masses. It is evident that the total amplitude of the motion produced by (or producing) the vibratory energy must under any circumstances be larger than the individual amplitude of the mass that is attached to the radiating member which abuts against the water, because the total amplitude is composed of the motion of the latter mass added to the motion of the other mass. These two motions will generally not be algebraically, vectorially additive; because a difference of phase between the motions of the masses will usually occur due to energy being given off at some point or other of the structure.

In practice, in submarine signaling it is always important to make the amplitude of the mass at the energy-converter larger than that of the mass at the sound radiator; therefore, the mass at the radiator should always be larger than the mass at the energy-converter.

When a vibratory structure in accordance with the present invention is used, composed of two masses connected by an elastic member, the ratio between the radiated energy and the energy that is not radiated (the energy producing ineffective vibrations), i. e. the wasteful damping, may be changed between wide limits by simply altering the ratio between the sizes of the two masses.

The energy transmitted at a given frequency of vibration by vibratory structures constructed according to the present invention depends principally upon the size of the freely vibrating mass and its amplitude of movement. But since, in sound producers, for example, the loudness of the sound is determined by the amount of energy applied and a certain amount of energy implies a certain size of the freely vibrating mass, the stipulation of a certain loudness implies a definite amplitude of the movements of the free mass. In the same way a certain amount of energy taken in by a sound receiver equipped with a free mass of given size will, of course, produce vibrations of the free mass of a corresponding amplitude. If the elastic member that connects the two masses consists of a rod the said amplitude requires a certain amount of elastic expansibility and compressibility of the rod. But as the materials of which the rod can be made (preferably metal) do not permit of a larger expansion than about 1/1000 of their length without deformation, the stipulation of a certain amplitude also implies a certain length of the rods used. If simple straight rods were employed, devices designed for large quantities of energy would have to be made inconveniently long.

In accordance with this invention this inconvenient length is obviated in apparatus in which the use of rods is desired or unavoidable by constructing the elastic rods that connect the masses like compensating pendulums. This is accomplished, for example, by fixing a rod to the mass adjacent to or forming the radiator and by attaching to the free end of this rod a second rod that extends back towards the radiating member. Hence the rods used are, so to speak, bent rods. An advantageous method of constructing devices embodying this feature consists in providing holes or slots in the free mass, in fixing the rods in the other mass or counterweight in such a manner as to pass through these holes without touching the free mass, in attaching to the free end of each rod a tube which extends back towards the free mass and which surrounds its rod, and in fixing the free mass to the free ends of the tubes. A plurality of concentric tubes may also be employed.

A result accomplished by this arrangement is that the distance between the two vibrating masses may be diminished at will independently of the length of the rod. This is a special advantage because it enables electromagnetically actuated devices (sound producers and receivers) to be produced in which the one mass can be constructed in the shape of the magnetized iron of the electromagnet whilst the second mass may be made to constitute the armature of the electromagnet. In cases of microphonic receivers the microphone may be inserted between the two said masses or these masses may themselves form parts of the microphone.

Sound signaling devices equipped with bent elastic rods of the kind just described are illustrated in Figs. 4, 5, 6, 8 and 9.

Fig. 4 illustrates a form of device having elastic posts or rods 50ª that are fixed to the mass 2 on the hull 8, and that are jointed together at their free or upper ends by a rigid plate 58, while the free mass 1 is connected to this plate by the downwardly or backwardly extending parallel rods 53ª that are arranged beside the rods 50ª instead of inside of them. The rigid plate 58 prevents transverse vibrations of the rods 50ª.

Fig. 5 shows the left half of a device having elastic rods 50 which pass up from the mass 2 and through the mass 1 to a turning point 52 whence a concentric elastic tube 53 extends back through the mass 1 to another turning point near the mass 2. From this point another concentric elastic tube 54 finally extends up again to the point where the mass 1 is attached. The elastic member 50, 53, 54 may be termed a rod with a plurality of turning points or reversals or bends. It will be observed that in such an elastic member at any moment during the vibration of the masses of the oscillatory structure some part of the elastic member will be subjected to expansion while another part will be subjected to compression.

If these devices are to be used as sound receivers no changes need be made if they are used as electromagnetic receivers. If the sounds are to be received with a microphone, a pressure microphone may be arranged between the masses 1 and 2. This microphone may then also serve as a damping means between the masses.

Instead of employing a plurality of rods extending back and forth the two masses may be connected so as to form a vibratory structure by one bent elastic connecting member only, such as is in the case of Figure 6. A device with one bent connecting rod offers the same advantages of construction as a device with more rods; and it offers the additional advantage that a plurality of tunes, concomitant notes and harmonics, which occur more readily when a plurality of rods are used, are more perfectly avoided. This one bent connecting rod is here again made up of a rod placed in the center of a tube and connected to the tube at the one end, the other ends of the tube and rod each being attached to a mass of the vibratory structure.

In connecting the masses of a vibratory structure of the new kind to each other by elastic members that extend out from one of the masses to a certain point and back from this point towards the said mass it is necessary to regulate the vibrations set up in the structure in a certain way. On the one hand attention must be paid to the stresses caused by these vibrations in the individual parts of the elastic members, and on the other hand the stresses have to be considered to which the elastic members are subjected as a whole. If the stresses are unevenly distributed over the individual parts of the bent elastic rods, or if the total stress exceeds a certain figure, the elastic members will be liable to destruction.

In accordance with the invention an even distribution of the stresses is achieved by making the parts of the elastic rods that extend out and back of such size that in equal lengths of these parts equal expansional and compressional forces are produced, i. e. if made of the same material, their material cross sections are made equal.

Excessive strain on the elastic connecting members as a whole will occur when the amplitudes of the vibrations executed by the masses of the vibratory structure exceed a certain figure, as, for example, in cases where the ineffective energy of vibration in the vibratory structure, i. e. the energy that performs no external work, rises above a certain limit. Such cases are particularly liable to occur when the structure is periodically excited. In accordance with the invention this rising of the amplitude of the vibrations above the permissible limit is prevented by making the product obtained by multiplying the effective total length of the elastic rods by the permissible specific elastic expansion, larger than the air gap between the vibrating masses at the ends of the elastic rods. In this way the advantage is obtained that the ineffective energy alone that is set up by exciting the structure is prevented from producing forces large enough to tear the rods asunder or to damage them by excessive expansion and compression, which might occur in cases where the damping of the vibrations of the vibratory structure is slight or where the masses of this structure vibrate without restraint.

In cases in which the amplitudes of the vibrations rise to a very high figure it may happen in an apparatus with a small air gap that the masses bump against each other and thus cause injuries. But such cases can be readily dealt with by arranging auxiliary damping means between the two masses. In receiving apparatus such a damping means presents itself in any case in the form of a microphone inserted between the vibrating masses.

In the apparatus shown in Figure 6, the diaphragm has a turned-up peripheral ring-like flange which in turn has an inwardly bent portion forming a flange on which a hood or cover 21 is securely seated. The center of the diaphragm 10 is provided with a screw stud 72 on to which the lower end of hollow rod or tube 50 is screwed. This hollow rod or tube 50 forms one portion of the elastic connecting member between the masses of the special vibratory structure. The other portion of the elastic connecting member is in the form of a hollow rod or tube 53 surrounding and concentrically arranged with respect to portion 50. The upper end of rod 50 is secured to the upper end of tube 53 by means of a screw-threaded joint 57. The rod 50 at its lower end, where it is attached to diaphragm 10, is provided with an externally threaded base or pedestal on which is screwed a plate 2 which carries an electromagnet; while the rod 53 at its lower end widens out to form a plate which carries the armature of the electromagnet. The rod 50 and tube 53 in the vibratory structure shown in this embodiment of the invention form an elastic connecting member which may be defined as having a reversal in its direction of extension, or as having reversed parallel portions.

The preferred construction of the electromagnetic system for the apparatus of Figure 6, is illustrated in Figure 7, which is a section along the lines 7—7 of Figure 6.

Although, as will be hereinafter explained, the arrangement of Figure 7 does not have a continuous or direct current polarizing coil, but has only an alternating current coil, the device nevertheless functions as an electromagnetic system, and for convenience sake we therefore designate the part of the system located at 2 as the electromagnet and the part located at 1 as the armature. To avoid internal losses from eddy currents the iron in the electromagnets has to be made up of sheets. Besides, to prevent the occurrence of deleterious vibrations the iron of the magnet must be distributed as symmetrically as possible to the axis of the centrally disposed elastic members.

Another desideratum is that the parts of the laminated iron of the magnet be held together firmly enough to prevent an impermissible internal damping effect being caused during the operation of the device by vibrations of the bunched iron sheets relatively to each other. To meet this requirement and at the same time to provide a device having its parts symmetrically arranged around a central axis is another of the objects of this invention, and this is accomplished by arranging a plurality (three at the least) of iron cores or pole pieces concentrically around the central elastic members. The individual laminæ of the cores are arranged to extend radially, or nearly so, to the center of the apparatus; and a channel is provided in the cores that runs across the laminæ and in which a common coil is placed so as to be concentric or approximately concentric to the elastic rod of the signaling device. An advantageous form of the device is produced by attaching a plate to the inner part and another plate to the outer part of the bent or reversed rod and in providing pairs of cheeks on these plates that extend generally radially and between which the bundles of laminæ are clamped, the laminæ being also fixed in position by welding them to the plates at their corners that abut against these plates. The advantages of this form of construction consist in the fact that the magnet cores can be built up of flat sheets in the form of stampings, that a concentric arrangement is obtained which permits of the device being almost completely finished by lathe work, and finally that the radial arrangement of the flat sheets or laminæ enables all the elements of the device to be excited by a common coil.

The poles of the magnet are divided into a number of groups of laminæ 73 which are so arranged about the rod 50 that the individual laminæ of each group extend as nearly as possible along radii extending from the center of the apparatus. The number of groups used may be various. A simple form of apparatus of small size is obtained, for example, by dividing the laminæ into three groups 73.

For fixing the parts or bunches 73 to the plates 1, 2 cheeks 74 are provided on the surfaces of the plates. These cheeks may be formed of the same pieces as the plates on a milling or shaping machine. The bunches of sheets or laminæ 73 are driven in between the cheeks 74 and the corners of the sheets adjacent to the plates are then welded to the surfaces of the latter. The lines of the welds are seen in section in Fig. 6 and marked 75.

This arrangement of the active iron of the electromagnet permits of all the groups or subdivisions of the poles being excited by a single coil 76 which is arranged as nearly concentric to the rod 50 as possible and is attached by coil holders 77 to the lower plate 2 so as to be suspended without touching the iron 73.

An advantageous method of joining the individual sheets or laminæ together, and of attaching the bunches of sheets to the other internal parts of the signaling device, consists in first bringing the sheets and the cheeks into the proper positions that they are to finally occupy relative to each other in the oscillatory structure. This positioning operation is carried out with the aid of a jig or template and the parts are kept in position by clamps so as to form a whole which is then welded onto the plate.

The advantages of this arrangement are that it is now possible to work the outer edge of the laminated iron of the magnet (and, if desired, this edge together with the plate supporting the laminated iron)

upon a lathe, and that in consequence of the concavity of the inner sides of the sheet-iron bunches of the magnet an elastic member of larger diameter can be used, so that a vibratory structure offering greater resistance to transverse vibrations is obtained. And finally the additional advantage is obtained that the exciting coil of the magnet can more readily be made circular, which renders it easier to produce than triangular or polygonal coils.

In carrying out this method, the individual sheet-iron bunches are united into a complete rigid set with their cheeks 74 before being fixed to the plate. To this end the sheets may be placed side by side in bunches upon a disk or plate, the proper form being imparted to the bunches with the aid of a template or jig and the bunches being temporarily held together in the proper positions by loose cheeks 74. The disk upon which the bunches are laid is provided with strong screws fitted into special cheeks and adapted to bear against the corners of the angular cheek pieces 74. After sufficient sheets have been inserted between the cheeks these latter are pressed together with the aid of the said screws until the proper size of the sheet iron bunches is reached. These bunches are then held together by clamps and can be thus lifted off the supporting disk after the said forming screws have been loosened and welded onto the plate of the magnet. The clamps are then removed and the entire iron body of the magnet worked on a lathe.

In Figure 9 an apparatus is shown in which most of the individual improvements which have been explained by reference to other figures are combined. The apparatus consists of a member or diaphragm 69 (sound radiator) adapted to impart sound waves or to take up sound waves from the medium against which it abuts, a casing or hood 71 that is closed by the said diaphragm, and a number of individual vibratory structures connected to each other and to the radiating diaphragm, each of the said structures embodying characteristic features of the invention.

In order to reduce the apparatus to the smallest possible size the outer edge of the diaphragm is bent backward and inward to form a horizontal flange by which the hood 71 is fixed to the diaphragm, which flange is smaller than the diameter of the diaphragm. This arrangement makes it possible to have a small apparatus as a whole and yet a large sound radiating surface abutting against the liquid. To obtain a favorable form of oscillations of the diaphragm the latter is provided with stiffening ribs 19 which extend radially from a central area 78 that is rigid in itself.

The first vibratory structure coupled with the diaphragm is connected to the diaphragm at a point on the elastic connecting members of the vibratory structure. This vibratory structure is formed of the masses 79 and 80 connected to each other by means of a circle of elastic rods 3$^c$ and a single elastic tube 36 arranged concentrically around the circle of rods. The coupling between the radiator and the vibratory structure is effected through the elastic member formed of the rods 3$^c$ and tube 3$^b$.

The mass 79 also belongs or is common to a second vibratory structure which comprises another mass 2 and an elastic diaphragm 16$^b$ connecting these masses 2 and 79 between which the carbon granules of a microphone are placed, that are kept in position by a soft ring 81 of felt or the like. Joined to this second vibratory structure is a third vibratory structure which consists of mass 2 (which includes the laminated iron 73 of an electromagnet), a second mass 1 formed of a plate and the armature 73' of the electromagnet, and of a number of concentric tubes 50, 53, 54 forming an elastic connecting member that extends upwards from the mass 2 to a certain point 57 and then back again to a point near the mass 2, and then up again to the mass 1. The elastic member thus has a plurality of reversals in the direction in which it extends and its elements are adapted to be subjected at one and the same moment partly to compression and partly to expansion. The vibratory structure comprising the masses 1 and 2 forms the electromagnetic exciter or receiver of the apparatus and for this reason is provided with a continuous current or polarizing coil 76' and an alternating current coil 76. To prevent changes of the air gap between the armature and the poles being caused by sagging of the elastic connecting tubes when the apparatus is turned from the vertical position shown in Fig. 9 into a horizontal position, the air gap is slightly curved as shown, the curvature being such as to correspond to the curve described by the parts at the gap when the said sagging takes place. The coils 76 and 76' are held clear of the iron of the electromagnet by special coil holders 77. The section indicated by the line 7—7 is shown in Figure 7.

Figure 10:
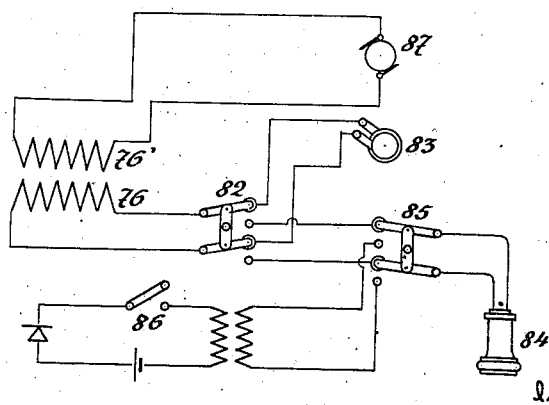
Figure 10 is a diagram showing the arrangement of the electric circuits of Figure 9.

The electrical circuits of the apparatus of Figure 9 are shown in Fig. 10. The alternating current coil 76 may be connected by a switch 82 to an alternating current generator 83 or to a telephonic receiver 84. A switch 85 is interposed in the leads to the receiver by which the latter may be connected to the microphone circuit 86. The continuous current of polarizing coil 76' is connected to a source of continuous current 87. This combination of circuits enables the apparatus to be used at will as an electromagnetic sound producer or sender, as an electromagnetic receiver, or as a microphonic receiver. In apparatus where the energy-converting means is not interposed between and acted upon by both the vibratory masses (for example, in Figure 1), it is in submarine communication, as hereinbefore pointed out, desirable to have the vibratory mass at the energy-converting means execute vibrations of greater amplitude than those executed by the mass at the radiating means. In apparatus, however, such for example as shown in Figures 2, 3, 4, 6, 8 and 9, in which the energy-converting device is located between and is acted upon by the two masses, which latter vibrate only toward and away from each other, the above difference in the amplitudes of vibration of the individual masses need not exist; for in such apparatus a larger amplitude of motion is secured at the energy converting means due to the fact that the amplitude of motion there is the sum of the amplitudes of motion of the individual masses. To make this point clear we will refer to Figure 6, and consider that the apparatus is being used as a receiver. A sound wave from the water strikes diaphragm 10 and thereby sets it, together with mass 2 rigidly connected thereto, in vibration. This vibration is communicated to mass 1 through the elastic connecting member 50, 53; but, due to the inertia of mass 1 and to the elasticity of the connecting member, masses 1 and 2 move only in opposite phases. Due to this latter fact, after the vibratory structure has once been set in vibration the variations from normal in the space or distance between the two masses will be equal to the sum of the amplitudes of motion of the individual masses. Thus the effective amplitude of motion at the energy converter is the sum of the amplitudes of motion of the individual masses. With an arrangement of this kind one advantage of a tuning fork, that it renders possible the applying or taking away of energy at points between the prongs where the combined amplitude is comparatively large, is also obtained; and at the same time the disadvantage inherent in tuning forks, namely that the vibratory forces have to be transmitted around corners or angles, is avoided. In addition, in the present invention, by reason of the vibratory structure being so constructed that its inelastic masses and the part or parts in which its elasticity resides are practically entirely distinct from each other, the exact adjustment of the ratio of the amplitudes at the points where energy is transferred to or taken from the vibratory structure to the amplitudes at the radiating member is made entirely subject to the discretion of the designer of the apparatus.

For convenience all devices capable of converting energy from one form into another such as microphones, electromagnetic devices etc. are called energy-converting means in the following claims and for the vibratory system or structures the general term energy-transferring-means will be used. Also, it is to be understood that the term "elastic connecting member" includes members consisting of one or more elements or parts; and that the word "inelastic", used with reference to the vibratory masses, means that the masses, which may be made of an elastic material such as iron, are inelastic in their uses or functions in the apparatus claimed. The word "tuned" is used in referring to the novel vibratory structure, to indicate that it operates in its natural frequency; in the same way a tuning fork is said to be "tuned".

What we claim is:

1. A tuned vibratory structure formed of two inelastic masses connected by an elastic member wherein the effective masses and elastic forces of the vibratory structure are substantially separated.

2. A tuned vibratory structure according to claim 1, in which the inelastic masses are of different magnitude to determine the amplitudes of the vibrations thereof.

3. A tuned vibratory unit formed of two bodies of concentrated mass and acoustically negligible elasticity and a connecting member of concentrated elasticity and acoustically negligible mass.

4. A tuned acoustic unit comprising terminal members and a connecting member, the frequency-determining mass of the unit being substantially confined to the terminal members and the frequency-determining elasticity of the unit being substantially confined to the connecting member.

5. Means for converting energy of sound waves into mechanical motion or vice versa, comprising a tuned vibratory structure including two members of substantial mass and negligible elasticity, and an elastic connecting member whose mass is small compared to the mass of either of the two members.

6. A device of the kind described, comprising a tuned vibratory structure including two members having substantial masses and a relatively massless elastic body connecting said members, said masses being of different magnitudes whereby the motion of one of said members, when imparted by means of said elastic body to the other member, will have its amplitude changed.

7. In combination, a tuned vibratory structure formed of two masses connected by a relatively massless elastic member, wherein the masses and the elastic forces of the structure are segregated; means for imparting vibrations to one of said masses to excite the structure; and means other than the elastic member adapted to be acted upon by the vibratory movement of the other of said masses.

8. In sound communication apparatus, a tuned vibratory structure formed of two inelastic masses connected by an elastic member wherein the effective masses and elastic forces of the vibratory structure are substantially separated, and energy-converting means having a portion forming a part of and movable with one of said masses and a cooperating portion forming a part of and movable with the other of said masses.

9. In sound communication apparatus, a tuned vibratory structure formed of two inelastic masses connected by an elastic member wherein the effective masses and elastic forces of the vibratory structure are substantially separated, and energy-converting means in the form of an electromagnetic system having the electromagnet movable with one of said masses and the armature movable with the other of said masses.

10. In sound communication apparatus, a tuned vibratory structure formed of two inelastic masses connected by an elastic member wherein the effective masses and elastic forces of the vibratory structure are substantially separated, the elastic member extending from one mass to a certain point and then back to carry the other mass at a point adjacent the first mass, and energy-converting means having a portion forming a part of and movable with one of said masses and a cooperating portion forming a part of and movable with the other of said masses.

11. In sound communication apparatus, sound radiating means, energy converting means, said acoustic energy transferring means adapted to act between the sound radiating means and the energy converting means, said acoustic energy transferring means including a tuned vibratory structure formed of two inelastic masses connected by an elastic member, wherein the effective masses and elastic forces of the vibratory structure are substantially separated.

12. In sound communication apparatus, sound radiating means, energy converting means, and acoustic energy transferring means adapted to act between the sound radiating means and the energy converting means, said acoustic energy transferring means including a tuned vibratory structure formed of two inelastic masses connected by an elastic member, wherein the effective masses and elastic forces of the vibratory structure are substantially separated, the energy converting means having a portion forming a part of and movable with one of said masses and a cooperating portion forming a part of and movable with the other of said masses.

13. In sound communication apparatus, a sound radiator, a tuned vibratory structure formed of two inelastic masses connected by an elastic member wherein the effective masses and elastic forces of the vibratory structure are substantially separated, one mass being vibratable with the sound radiator, the elastic member extending from said mass to a certain point and then back to carry the other mass at a point adjacent the first mass, and energy-converting means having a portion forming a part of and movable with one of said masses and a cooperating portion forming a part of and movable with the other of said masses.

14. In sound communication apparatus, a tuned vibratory structure formed of two inelastic masses connected by an elastic member wherein the effective masses and elastic forces of the vibratory structure are substantially separated, the elastic member extending from one mass to a certain point and then back to carry the other mass at a point adjacent the first mass, and energy-converting means in the form of an electromagnetic system having the electromagnet movable with one of said masses and the armature movable with the other of said masses, the electromagnet and the armature being so spaced from each other that the distance between them is greater than the maximum movement permitted by the elastic member.

15. In sound communication apparatus, sound radiating means tuned to a certain frequency, and a vibratory structure coupled thereto and tuned to the same frequency, said vibratory structure being formed of two inelastic masses connected by an elastic member wherein the effective masses and elastic forces of the vibratory structure are substantially separated.

16. In sound communication apparatus, sound radiating means, energy converting means, and acoustic energy transferring means adapted to act between the sound radiating means and the energy converting means, said acoustic energy transferring means including a tuned vibratory structure formed of two inelastic masses connected by an elastic member wherein the effective masses and elastic forces of the vibratory structure are substantially separated; the sound radiating means and the said vibratory structure being individually tuned and coupled so that the frequencies of resonance of the tuned system after coupling cover the range of frequencies for which the apparatus is to be used.

17. In sound communication apparatus, a tuned vibratory structure formed of two inelastic masses connected by an elastic member wherein the effective masses and elastic forces of the vibratory structure are substantially separated, the elastic member extending from one mass through a passage in the center of the other mass and then to the point of connection with the latter mass, and energy-converting means in the form of an electromagnetic system having the electromagnet movable with one of said masses and the armature movable with the other of said masses.

18. Apparatus according to claim 17; in which the electromagnet comprises a body of iron formed of laminæ extending generally radially to said passage, and an electric coil for magnetizing said body of iron.

19. Apparatus according to claim 17; in which the electromagnet comprises a plate, a pair of cheeks on said plate, a body of iron laminæ extending generally radially to said passage clamped in between said cheeks and welded to said plate, and an electric coil for magnetizing said body of iron.

20. In submarine sound communication apparatus, a diaphragm abutting against the sound propagating medium, a tuned vibratory structure formed of two inelastic masses connected by an elastic member wherein the effective masses and elastic forces of the vibratory structure are substantially separated, one mass being connected to said diaphragm, the elastic member being formed of a rod extending from said mass and a tube having an end secured to the distant end of said rod and concentrically arranged with respect to said rod, the other mass being secured to the other end of said tube, said masses being closely adjacent each other, and energy-converting means having a portion forming a part of and movable with one of said masses and a cooperating portion forming a part of and movable with the other of said masses.

21. In submarine sound communication apparatus, a diaphragm abutting against the sound propagating medium, a tuned vibratory structure formed of two inelastic masses connected by an elastic member wherein the effective masses and elastic forces of the vibratory structure are substantially separated, one mass being connected to said diaphragm, the elastic member being formed of a rod extending from said mass and a tube having an end secured to the distant end of said rod and concentrically arranged with respect to said rod, the other mass being secured to the other end of said tube, said masses being closely adjacent each other, and energy-converting means in the form of an electromagnetic system having the electromagnet movable with one of said masses and the armature movable with the other of said masses.

22. In submarine sound communication apparatus, a diaphragm abutting against the sound propagating medium, a tuned vibratory structure formed of two inelastic masses connected by an elastic member wherein the effective masses and elastic forces of the vibratory structure are substantially separated, one mass being located at the central portion of said diaphragm, the elastic member being formed of a rod extending from said mass in a direction perpendicular to the face of said diaphragm and a tube having an end secured to the distant end of said rod and concentrically arranged with respect to said rod, the other mass being secured to the other end of said tube, said masses being closely adjacent each other, and one mass including an electromagnet and the other mass including an armature.

In testimony whereof we affix our signatures.

HEINRICH HECHT.
LEONID ADELMANN.
ALARD du BOIS-REYMOND.
WALTER HAHNEMANN.